Figure 1:
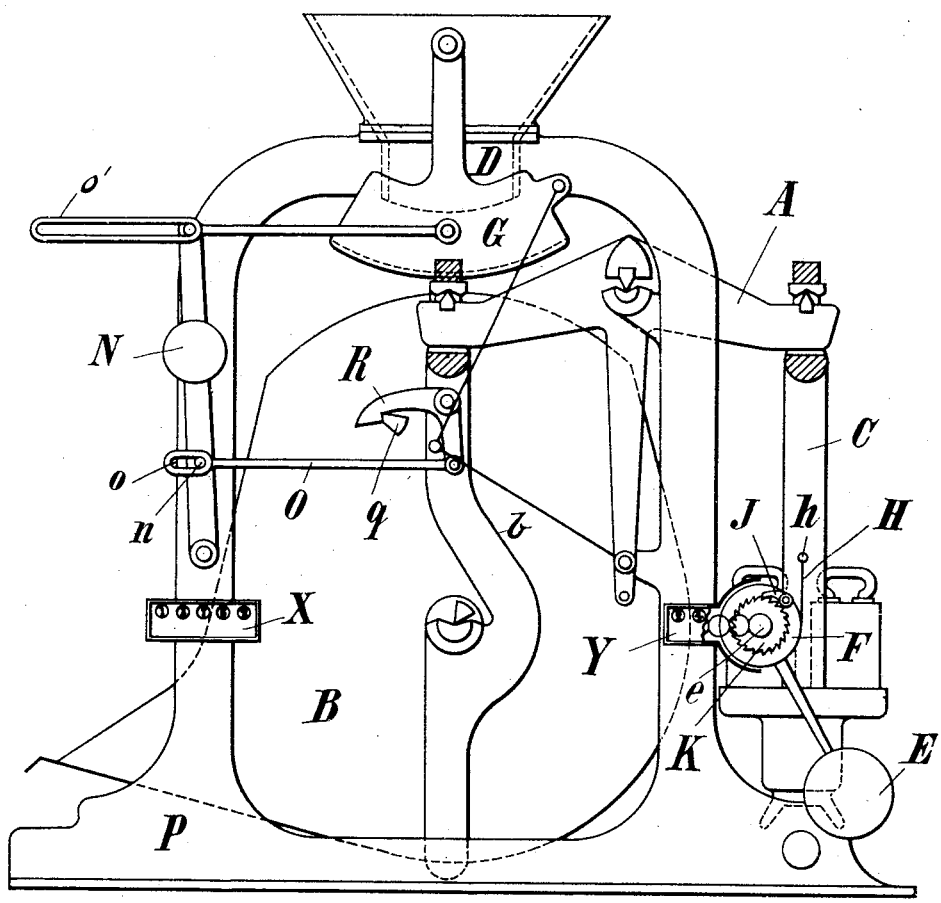

(No Model.) 2 Sheets—Sheet 1.
M. E. REISERT.
AUTOMATIC WEIGHING APPARATUS.

No. 483,636. Patented Oct. 4, 1892.

Witnesses:
H. G. Dieterich
O. W. Sommers.

Inventor:
Michael E. Reisert
By [signature] Atty (No Model.) 2 Sheets—Sheet 2.

M. E. REISERT.
AUTOMATIC WEIGHING APPARATUS.

No. 483,636. Patented Oct. 4, 1892.

Witnesses:
H. G. Dieterich
O. W. Sommers

Inventor:
Michael E. Reisert
By _____ Atty

UNITED STATES PATENT OFFICE.

MICHAEL EDUARD REISERT, OF HENNEF-ON-THE-SIEG, GERMANY.

AUTOMATIC WEIGHING APPARATUS.

SPECIFICATION forming part of Letters Patent No. 483,636, dated October 4, 1892.

Application filed February 1, 1892. Serial No. 419,945. (No model.)

*To all whom it may concern:*

Be it known that I, MICHAEL EDUARD REISERT, a subject of the German Emperor, residing at Hennef-on-the-Sieg, in the German Empire, have invented certain new and useful Improvements in Automatic Weighing Apparatus, of which the following is a specification.

My invention relates to improvements in automatic weighing apparatus, such as used for weighing grain; and the object of the same is to adapt such weighing apparatus for ascertaining the weight of coarse or granular and irregular-sized material, as potatoes, turnips, coal, ore, and the like, as well as for irregularly-supplied materials.

The automatic weighing apparatus heretofore in use for ascertaining the weight of small-grained or pulverized substances is so constructed that shortly before the emptying of the receptacle for receiving the material to be weighed the supply of the latter is first reduced to a minimum—as shown and described, for instance, in Letters Patent of the United States, granted to me June 24, 1888, No. 376,965—by closing a slotted gate, through the small slots of which a small quantity of the material is allowed to pass into the receptacle until the desired total weight is obtained, whereupon the supply is entirely cut off by a second gate. This construction of the weighing apparatus will, however, not answer the desired purpose when substances of the kind heretofore mentioned are to be weighed, for the reason that the slotted gate cannot be used.

According to the present invention the material is continuously supplied to the receptacle until the contents thereof are of a given weight, and as soon as this is the case and the arm of the scale-beam to which the weight-pan is attached begins to ascend a gate beneath the hopper is released and closes the supply-passage, whereby the supply is entirely stopped. The receptacle is then ready to be tilted for the purpose of discharging its contents; but inasmuch as it is impossible to cut off the supply of material to the receptacle B with sufficient precision to prevent any material passing into said vessel after the scale-beam is in equilibrium I provide means not only for weighing the excess of such material before the vessel B is tilted to discharge its contents, but also for automatically registering the weight of such excess by means of registering devices, either separated from or combined with the devices employed for registering the number of loads or charges weighed. I attain these objects by the mechanism illustrated in the accompanying drawings, in which—

Figure 2:
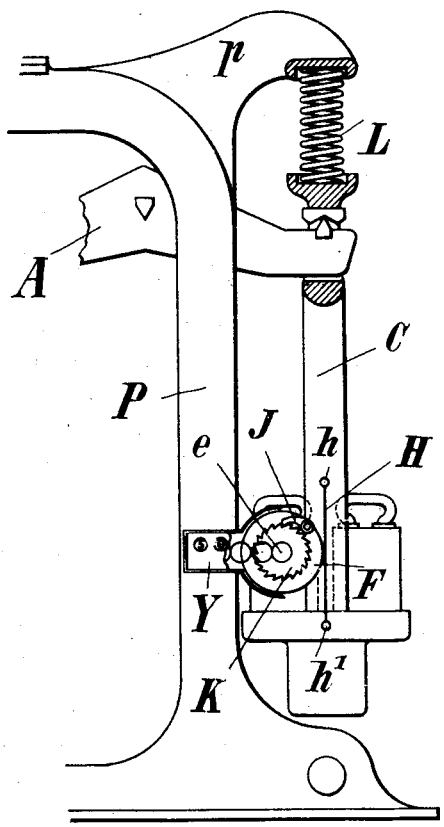
Figure 3:
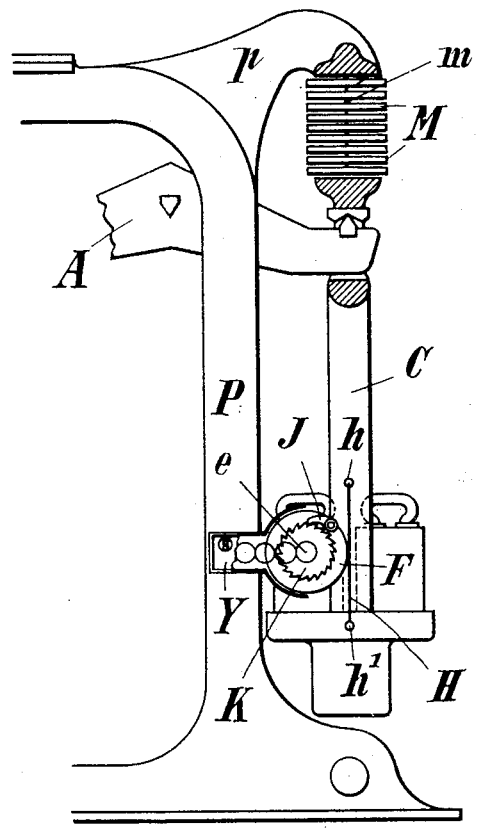

Figure 1 is a side elevation of the weighing apparatus embodying my invention, and Figs. 2 and 3 illustrate modifications hereinafter referred to.

Similar letters denote similar parts throughout the several views.

A is the scale-beam; B, the receptacle for receiving the material to be weighed; $b$, the hanger by means of which the receptacle is suspended from the scale-beam, and C the pan for the weights. The material to be weighed passes from a hopper D into the receptacle B, which when properly filled empties itself automatically in a well-known manner, each weighed charge or load in the receptacle being registered by the registering mechanism X in a well-known manner. Beneath the hopper D is arranged a gate G, so as to oscillate on a suitable pivot and cover or uncover the outlet of the hopper. The weights on the pan C are so adjusted that the descending movement of the receptacle B and consequently the cutting off of the supply of material to said receptacle and the emptying of the latter will take place only after at least a quantity of material of a predetermined weight—as, for instance, five hundred pounds—is contained in said receptacle B. This weight of each charge of material, as already mentioned, is registered by the mechanism X each time the contents of the receptacle B are discharged. That part of the material supplied to the receptacle B which exceeds the normal weight (five hundred pounds) of a charge and which, according to the nature of the material, varies considerably is also registered by a registering mechanism Y, attached to the frame P of the weighing apparatus. To effect this, I provide in connection with the scale-beam A and preferably with the pan C for the weights a weighted lever E, Fig. 1, a spring L, Fig. 2, or a number of disks M, Fig. 3, or any other resistance which increases on the descending of the receptacle B and which is designed, besides the normal weights on the pan C, to be overcome by the filled and somewhat overcharged receptacle until the scale-beam equipoises.

Such an increasing resistance as employed in my improved weighing apparatus and shown in Fig. 1 consists of a weighted lever or pendulum E, firmly secured to a roller F, which is adapted to turn about a pivot $e$, journaled in a lateral bracket of the frame P. Around the periphery of the said roller is wound a rope or band H, the free end of which being connected to the pan C for the weights by means of a projecting bolt or stud $h$. As the weight-pan C ascends the pendulum E is caused to oscillate about its axis, and the amplitude of its oscillation will increase in proportion to the weight of the material received within the receptacle B beyond the predetermined weight of a charge. This oscillating movement of the pendulum E, of which the roller F partakes, is transmitted to the registering mechanism Y by means of a pawl U on the roller and a ratchet-wheel K, firmly secured to the axis $e$ of the roller F and pendulum E, said axis or pivot $e$ having motion independently of the said roller. Thus the weight of the material exceeding that of a normal charge of the receptacle B is registered by the registering device Y and the excess in weight added to the amount previously registered, if any. In this manner each excess of the weight of a normal charge is successively registered, so that after the last charge is weighed the registering mechanism Y will indicate the total weight of the excess of material in each load weighed, while the registering mechanism X will indicate the number of loads weighed, so that the weight of the several charges or loads weighed can be readily ascertained.

In the modification Fig. 2 the weighted lever E is replaced by a coiled spring L, bearing upon a bracket $p$ of the frame P, and the weighted arm of the scale-beam, which spring is compressed in proportion to the weight of the material in excess of the weight of a normal charge, while in the modification Fig. 3 the increasing resistance is formed by a plurality of freely-suspended lamellar or disk weights M, which are connected one with another by a cord or chain $m$, suspended from the lateral bracket $p$ of the frame in such a manner that the single plates may be successively raised by the scale-beam and therefore consecutively act by their weight upon the latter. In both latter cases the cord or belt H is not firmly connected with the roller F, but wound around the same, both ends of the cord being connected with the weight-pan C in order to carry the roller back to its normal position when the weight-pan returns to its normal position. The oscillation of the roller F is transmitted to the registering device Y in the same manner as heretofore described with reference to Fig. 1.

In order that the weight of the material in excess of that of a normal charge of the receptacle B (the weight of which is first registered by the mechanism X, as aforesaid) may exert its full power upon the pendulum E, or the described equivalents therefor, care should be had that the contents of the receptacle will not be prematurely discharged, but that immediately after the closure of the cut-off gate G of the supply-funnel D the said receptacle will first accomplish its descending movement before tilting to discharge the contents thereof. I attain this object by means of a weight or weighted lever N, pivoted to the frame P, which is adapted to be first released by the gate G, or, as shown in Fig. 1, is first brought into the tilting position on the closing of the gate through the medium of the slotted rod O' and then to act by its momentum upon the rod O so as to trip a bell-crank lever R, pivoted to the hanger $b$ of the receptacle B, and disengage said lever from a projection $q$ on said receptacle, thus allowing the latter to tilt or turn on its knife-edges to discharge the contents. To this end the lever N is in engagement with the rod O through a stud projecting into a slot $o$ of said rod, and the length of the slot $o$ is so adjusted that the receptacle B can move downwardly the required distance before the lever N can act upon the rod O for the described purpose.

Any suitable means may be employed for automatically operating the gate G, as, for instance, mechanism such as shown in Letters Patent of the United States, granted to me January 24, 1888, No. 376,965, which means I have deemed unnecessary to show, as they form no part of this invention.

Having thus described my invention, what I claim as new therein, and desire to secure by Letters Patent, is—

1. In a weighing apparatus, the combination, with the scale-beam, a self-tilting receptacle suspended therefrom, a hopper for supplying the material to the receptacle, and a cut-off for the supply, of a resistance antagonizing the movement of the scale-beam with the loaded receptacle whenever said load is heavier than the weight on the beam, a device for retarding the tilting of the vessel until the supply is cut off, and means for ascertaining the weight of the power exerted by said resistance, for the purpose set forth.

2. In a weighing apparatus, the combination, with the scale-beam, a self-tilting receptacle suspended therefrom, a hopper for supplying the material to the receptacle, and a cut-off for the supply, of a variable resistance antagonizing the movement of the scale-beam with the loaded receptacle whenever said load is heavier than the weight on the beam, a device for retarding the tilting of the vessel until the supply is cut off, and means for ascertaining the weight of the power exerted by said resistance, for the purpose set forth.

3. In a weighing apparatus, the combination, with the scale-beam, a self-tilting receptacle suspended therefrom, a hopper for supplying the material to the receptacle, and a cut-off for the supply, of a variable resistance antagonizing the movement of the scale-beam with the loaded receptacle whenever said load is heavier than the weight in the weight-pan of the beam, said resistance increasing in proportion to the overweight of the load, and a registering mechanism controlled from said weight-pan, whereby the weight of a load equal to that in the scale-pan, as well as any excess of such weight, can be registered, and a device for retarding the tilting of the vessel until the supply is cut off, substantially as and for the purpose set forth.

4. In a weighing apparatus, the combination, with the scale-beam, the receptacle for the material to be weighed suspended therefrom and adapted to automatically tilt when the arm of the beam to which it is suspended descends, the gate G, and slotted rod O', connected therewith, of the locking-pawl R, adapted to engage a lug $q$ on the receptacle, the slotted rod O, and the weighted lever N, having pins or studs extending into the slots of the said rods O and O', respectively, substantially as and for the purpose set forth.

In testimony that I claim the foregoing as my invention I have signed my name, in presence of two witnesses, this 16th day of December, 1891.

MICHAEL EDUARD REISERT.

Witnesses:
H. A. MAXWELL,
SIBILLA LANG.